United States Patent [19]

Hetzel

[11] 4,338,556
[45] Jul. 6, 1982

[54] ELECTRONICALLY CONTROLLED THREAD-CUTTING MACHINE

[76] Inventor: Max Hetzel, Engestrasse 11, 3012 Bern, Switzerland

[21] Appl. No.: 95,994

[22] Filed: Nov. 20, 1979

[30] Foreign Application Priority Data

Dec. 4, 1978 [CH] Switzerland .................. 12337/78

[51] Int. Cl.³ .......................................... G05B 19/18
[52] U.S. Cl. .................... 318/569; 318/685; 318/283; 318/640; 318/601; 318/603; 318/434; 10/129 R; 10/136 E; 408/6; 408/11; 408/13
[58] Field of Search ............... 318/696, 685, 283, 569, 318/640, 601, 603, 600, 434, 254; 408/3, 6, 10, 11, 13; 10/129 R, 136 R, 136 E, 136 TS

[56] References Cited

U.S. PATENT DOCUMENTS

| | | | |
|---|---|---|---|
| 3,021,464 | 2/1962 | Philip | 408/3 |
| 3,024,399 | 3/1962 | Valentino | 318/283 |
| 3,545,310 | 12/1970 | Porath et al. | 408/11 |
| 3,564,633 | 2/1971 | Stade | 10/129 |
| 3,586,953 | 6/1971 | Markkanen et al. | 318/685 |
| 3,676,651 | 7/1972 | McDaniel | 318/569 |
| 3,689,166 | 9/1972 | Jacob, Jr. | 408/11 |
| 3,720,135 | 3/1973 | Merner et al. | 408/11 |
| 4,002,960 | 1/1977 | Brookfield et al. | 318/432 |
| 4,042,863 | 8/1977 | von der Heide | 318/254 |
| 4,129,813 | 12/1978 | Hunts et al. | 318/696 |
| 4,157,231 | 6/1979 | Phillips | 408/11 |

FOREIGN PATENT DOCUMENTS 1092691 11/1967 United Kingdom .

OTHER PUBLICATIONS

"DC Motors, Speed Controls, Servo Systems", Electrocraft Corp., pp. 6-25 to 6-35.

Primary Examiner—Gene Z. Rubinson
Assistant Examiner—Eugene S. Indyk
Attorney, Agent, or Firm—Wender, Murase & White

[57] ABSTRACT

An electronically controlled thread-cutting machine comprising a pulse controlled stepping motor for driving the thread-cutting tool, sensor means for scanning an adjustable thread depth and the torque on the thread-cutting tool, said scanning means comprising a counter for determining the steps of the motor and the number of revolutions of the thread-cutting tool respectively therefrom for determining the depth of the thread, and the current consumption of the motor being used for determining the torque transmitted to the thread-cutting tool, the motor being controlled in accordance with the torque and depth of the thread by microprocessor means for reversing the motor when the torque exceeds an upper limit torque and when the desired and preselected thread depth has been attained.

9 Claims, 4 Drawing Figures

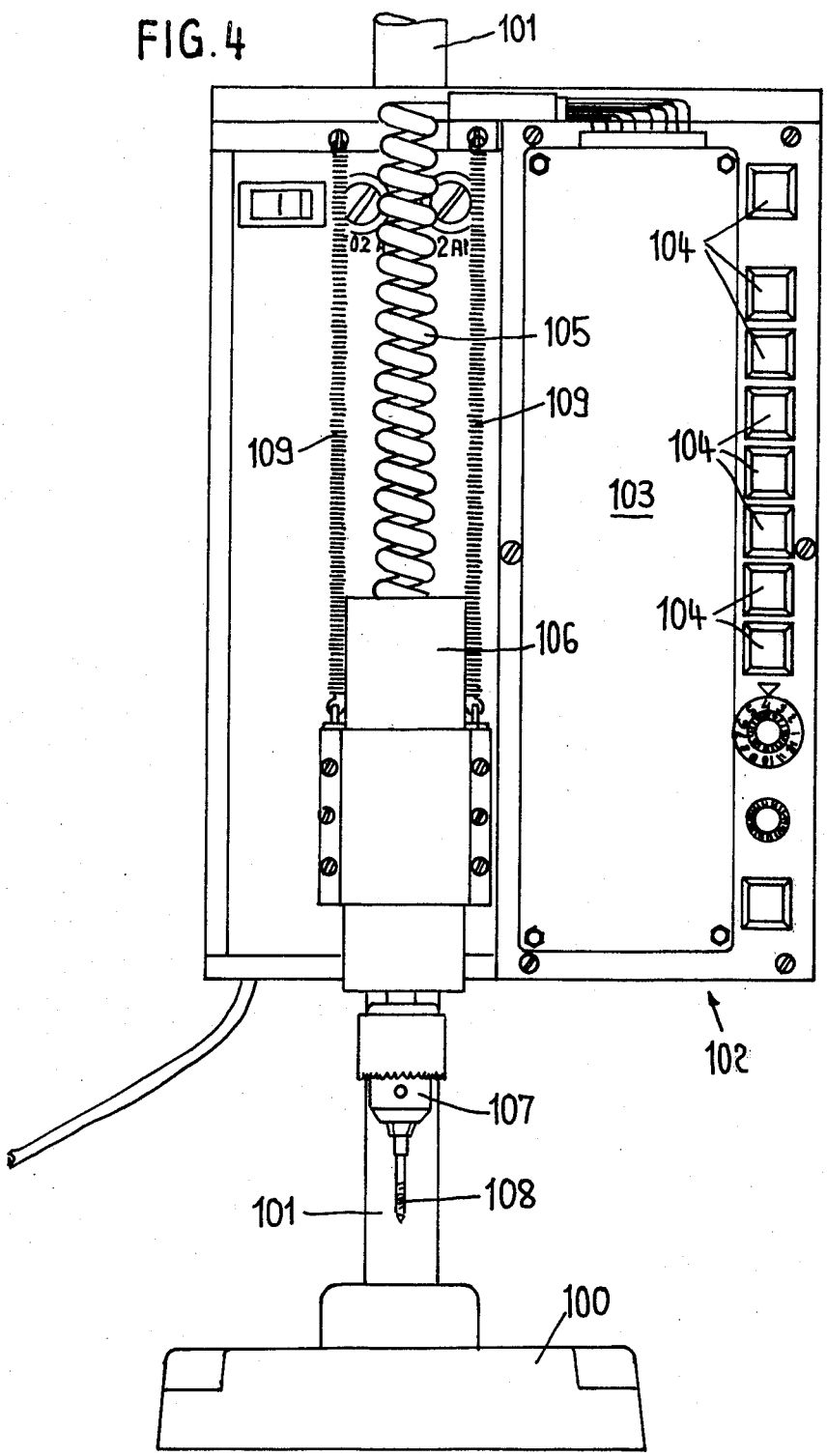

ELECTRONICALLY CONTROLLED THREAD-CUTTING MACHINE

Thread-cutting machines are known in which the torque on the thread-cutting tool and the thread depth influence the operation of the thread-cutting machine by various methods. In particular mechanically operating thread-cutting heads for receiving a thread-cutting tool are known. They are usually clamped in a drill chuck of an upright drilling machine or a lathe. The torque on the cutting tool is limited by a slipping clutch for protecting the cutting tool, or special mechanisms having a reverse drive to change the direction of rotation of the cutting tool when the motor is overloaded.

The depth of thread is limited by adjustable stops which actuate a reversing drive so that, when the adjusted thread depth is achieved, the thread-cutting tool is unscrewed from the drill hole. Instead of the reversing drive, the direction of rotation of the motor can also be electrically controlled by a switch and a contactor, an adjustable bolt actuating the switch when an adjusted depth of thread is achieved.

With all these mechanisms the torque on the thread-cutting tool and the depth of thread are measured purely mechanically and the control of the change of rotation is also effected mechanically or at least electro mechanically with switches and contactors.

The present invention concerns an electronically controlled thread-cutting machine in which mechanical sensors for measuring the torque on the cutting tool and the depth of thread would not be suitable. Similarly a mechanical or even electro-mechanical control of the direction of rotation of the cutting tool would be unsuitable.

According to the present invention there is provided an electrically controlled thread-cutting machine, comprising an electric motor, with or without reduction gears, for driving a thread-cutting tool, a sensor for scanning an adjustable thread depth and an adjustable torque on the thread cutting tool, and mechanical or electrical means for changing the direction of rotation of the motor, wherein the motor is a multi-phase motor, the rotor of which has at least one pair of magnetic poles, and has sensors for scanning the rotary position of the rotor, electrical signals of said sensors being used by way of an electronic circuit for controlling the feeding of the phases of the motor and for counting the rotations of the rotor, and the current of the motor serves for measuring and evaluating the torque on the cutting tool by means of an electronic circuit.

Preferably, the motor is a three-phase electric motor with a permanently magnetic rotor, said motor being equipped with a plurality of sensors, preferably three sensors, for scanning the angular position of the rotor. The electrical signals of the sensors are used for determining the position of the rotor by means of an electronic circuit for controlling the feed of the phases of the motor and for counting the rotations of the rotor, and the current of the motor serves for measuring and evaluating the torque on the cutting tool by means of an electronic circuit. The sensors for scanning the position of the rotor preferably have photo-sensitive and light-emitting elements, preferably photo-transistors and infra-red light emitting diodes and a diaphragm is secured to the shaft of the motor which rotates between the photo-sensitive and the light emitting elements.

Further, the electronic control circuit is provided, as an essential component, with a microcomputer which effects accurate counting of the turns of rotation of the motor whilst evaluating all the signals of the sensors for scanning the rotary position of the motor. Furthermore, the microcomputer effects the control of the phases of the motor in both directions of rotation and, in addition, evaluates the measurement of the torque on the thread-cutting tool.

The three-phase motor with permanently magnetized rotor and triple photo-transistor and infra-red diode arrangement for scanning the rotary position of the rotor by means of a diaphragm secured to the motor shaft, is particularly well suited for microcomputer controlled thread-drilling machines. Due to its very high degree of efficiency the current-torque characteristic of the motor is almost linear and substantially independent of the speed of the motor, so that the torque on the thread-cutting tool can be very accurately and rapidly measured. A further advantage is that despite the continuously rapidly changing direction of rotation of the motor there is almost no heating and no wear of the motor, since it has no collector in which the brushes will become rapidly worn in such operation and the collector plates would be soiled. A further advantage resides in the triple arrangement of the sensors which is necessary for controlling the motor but permits, as an additional advantage, reliable counting of the rotations of the motor to be effected, a feature which may be used for determining the depth of the cutting tool in the drill hole.

The present invention will be described further, by way of example, with reference to the accompanying drawings, in which:

FIG. 4 shows the construction of a thread-cutting apparatus.

Figure 1:
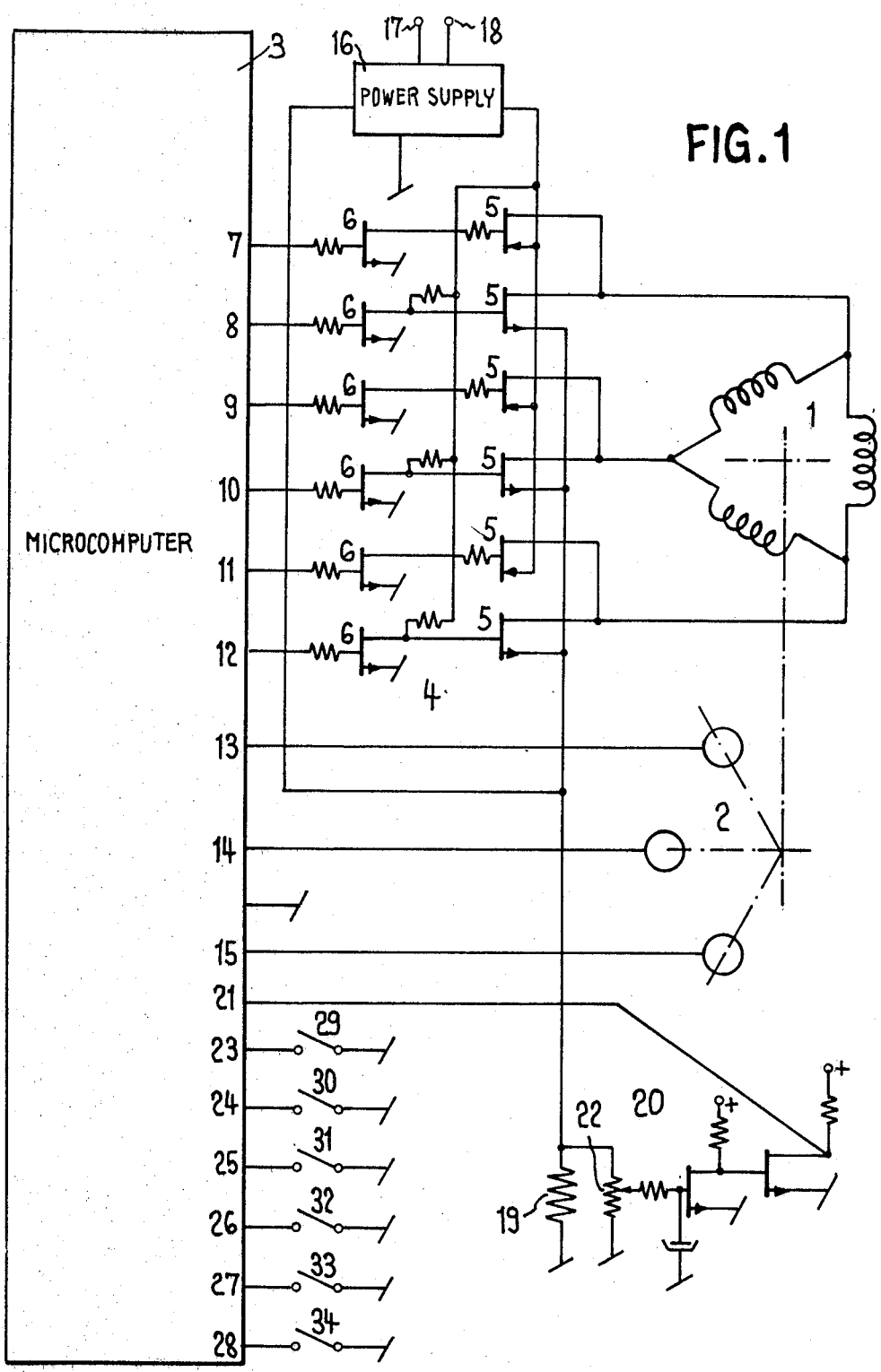
FIG. 1 shows an electronic control circuit for a motor and incorporating a microcomputer.

Instead of the microcomputer, hard wired discrete electronic components or an ordinary commercial IC could be used.

A delta connected three-phase motor 1 (it could alternatively be star connected) is supplied from an electronic output circuit 4, which will be described hereinafter and comprises six Darlington output transistors 5 and six driver transistors 6. The electronic output circuit 4 is controlled by six outputs 7 to 12 of a microcomputer 3. A photo-transistor arrangement 2, with three photo-transistor/infra-red diode pairs is mounted on the motor at spacings of 60° on the shaft of the motor 1. A diaphragm, not shown, on the axis of the motor 1, blocks the light of the infra-red diodes according to the position of the rotor. Thus the photo-transistors either receive light or no light, and the different signals of the photo-transistors resulting therefrom are supplied to the inputs 13, 14 and 15 of the microcomputer 3. The direct current supply of the motor 1 is provided via an electronic power supply circuit 16 (not shown in detail) which is fed from the mains at the terminals 17 and 18. A low-value resistor 19 produces a voltage drop which is equal to the product of the motor current and the value of resistor 19. The voltage drop controls, on the one hand, the electronic power supply circuit 16 in such manner that the voltage drop caused by the ohmic resistance of the motor windings is added to the supply voltage in order to determine the speed of the motor to some extent independently of the load. On the other hand, the voltage drop serves, by way of the resistor 19, to deliver a signal to the input 21 of the microcomputer 3, via the circuit 20 (not described in detail), when the motor current and consequently its torque have exceeded a value fixed in the potentiometer 22. The inputs 23 to 28 of the microcomputer 3 serve to pre-program the microcomputer 3 by way of buttons 29 and 34 and are described in greater detail later in the description of the program flow diagram in FIG. 2.

The microcomputer 3 is composed of at least a clock oscillator, a micro-processor, a fixed value memory ROM, PROM or EPROM, a RAM memory and a few input and output gates. The input and output gates with their connections 7 to 15, 21 and 23 to 28 connect the micro-computer 3 with the circuits disposed externally of the micro-computer 3.

Figure 2:
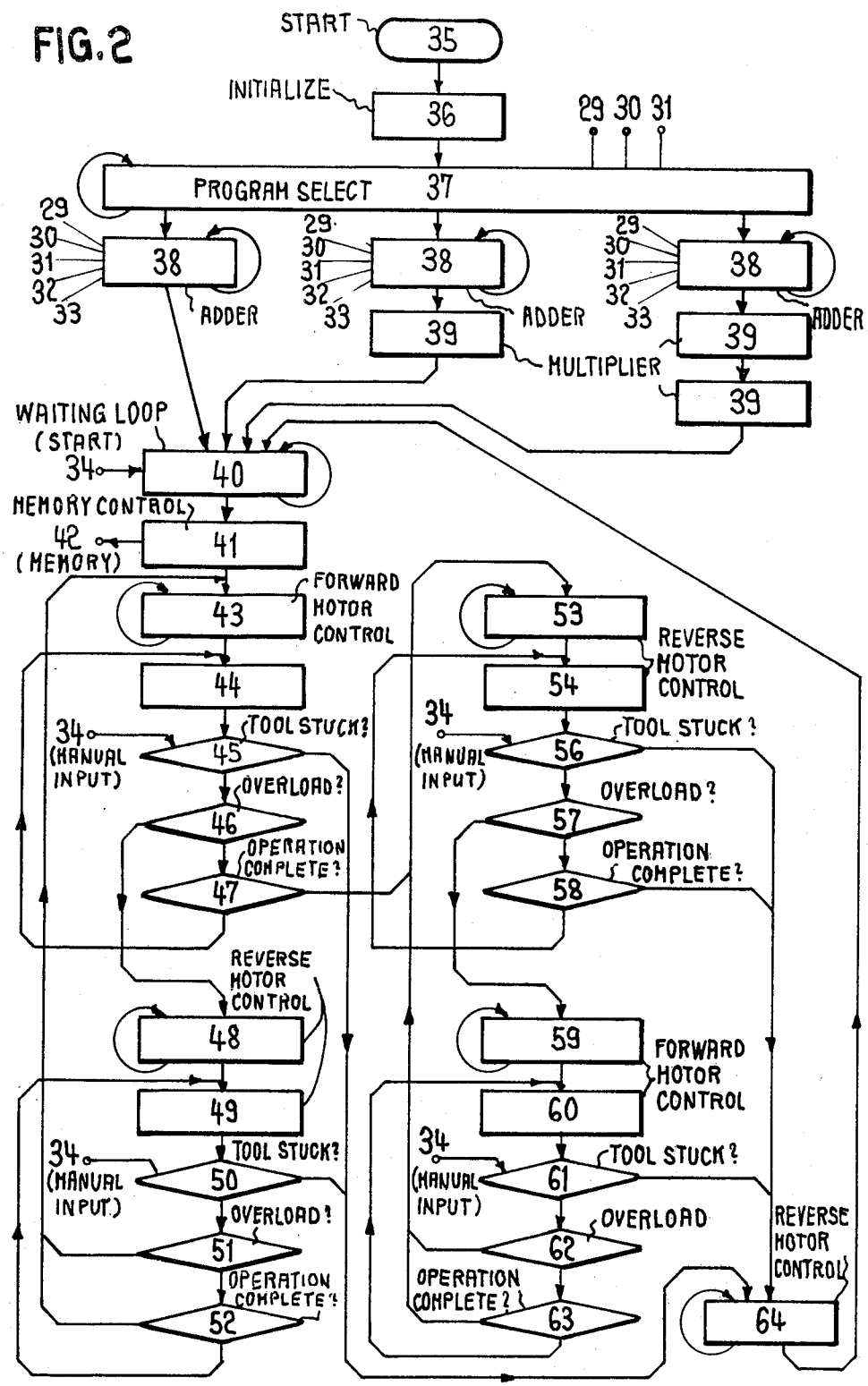
FIG. 2 is a simplified flow diagram for the microcomputer.

FIG. 2 is a program flow diagram of the micro-computer 3. At 35 the microcomputer 3 is started with a button. The process commences with an initializing program 36 which defines the inputs and outputs of the microcomputer and occupies a few RAM memory locations with data. In the program selecting program block 37, the microcomputer remains suspended in a waiting loop until one of the buttons 29, 30 or 31 is pressed. By means of these three buttons 29, 30, 31 it is possible to select one of three different programmes which are distinguished in that the subsequently selected number of thread convolutions is multiplied by one, eight or 64. In practice, various reduction gears would be inserted between the motor shaft and cutting tool, according to these multiplication factors. Thus the range of various thread diameters can be extended with one motor. After one of the buttons 29, 30 or 31 is pressed, the microcomputer jumps to one of the program blocks 38, in which it remains suspended again in a waiting loop. By using the same buttons 29, 30, and 31 and an additional button 32, a desired number of thread convolutions from 0 to 15 is programmed in. The binary numbers 1, 2, 4 and 8 are associated with the inputs 29 to 32 so that, after an add button 33 is pressed, the values of the pressed buttons 29 to 32 are added together. Simultaneously, the button 33 releases the microcomputer from the waiting loop and the program proceeds through two, one or none of the multiplication program blocks 39 according to the initial program selected. The microcomputer reaches the waiting loop 40 and moves further only when the motor starting button 34 is pressed.

In program block 41 the selected number of thread convolutions is stored in a RAM memory located 42. This RAM memory location serves for the up and down counting of the number of convolutions as soon as the motor is running. The microcomputer then runs through program block 43 which essentially takes over the control of the motor in the forward direction and, in RAM memory location 42, counts down the revolutions executed by the motor. A more exact description of the control of the three-phase motor and the counting will be given subsequently with reference to FIG. 3. Program block 44 is the same as program block 43, but without being included in a time delay loop of about 0.1 sec. This time delay in program block 43 is necessary since, with starting, or reversal of the direction of rotation of the motor, high currents could flow in the motor and influence the subsequently described overload program block 46 as a result of its own moment of inertia. The subsequent program block 45 is for safety. If the cutting tool should stick, because it is worn or there are too many chippings in the thread hole, the course of the program can then be transferred to program block 64 by pressure on the button 34, whereby the motor runs backwards for about 1/10 of a sec. and the program then jumps to the waiting loop 40. The motor stops and the cutting tool must be carefully unscrewed from the thread hole by hand.

If the safety button 34 is not used, the microcomputer runs through program block 46 where overloading of the cutting tool is measured at the input 21. If no overloading is detected, the microcomputer runs through program block 47 where a check is made to see whether the number of convolutions in the RAM memory location 42 has been counted down to zero. If this is not the case, the microcomputer jumps back to the program block 44. Program blocks 44, 45, 46 and 47 are now continuously run through until a decision is made in program block 46 or 47. If no overloading of the cutting tool takes place, then finally program block 47 decides that the desired number of convolutions is achieved and causes the microcomputer to jump to program block 53 whereby the direction of rotation of the motor is reversed and the thread-cutting tool is withdrawn from the thread hole. However, if overloading of the cutting tool takes place before this program jump, the microprocessor in program block 46 jumps to program block 48.

Program block 48 is very similar to program block 43, but the motor is controlled in reverse and the revolutions executed by the motor are counted in RAM memory location 42. Again, in program block 48 the motor-control program is included in a small time delay loop, so that the high current after the change of direction of rotation in the motor cannot influence the overload program block 51. Similar to program block 48 is program block 49 but this is constructed without delay loops. Program block 50 follows for the emergency holding of the motor as in program block 45, program block 51 serves for ascertaining overloads of the cutting tool as in program block 46, and program block 52 which determines when the number of threads in the RAM memory location 42 has again reached the starting value. As long as no decision is made in program blocks 51 and 52, the microcomputer 3 continuously passes through program blocks 49 to 52. The cutting tool retreats from the thread hole until program block 52 establishes that the cutting tool is completely unscrewed out of the thread hole. The microprocessor then jumps back to program block 43, the motor rotates again in the forward direction and repeats the program sequence until it is decided, in program block 47, that the desired depth of thread is achieved. Thus, again in the reverse direction of the motor, no overloading of the cutting tool can take place, due to chippings in the thread hole, program block 51 decides in such a case for the return of the microcomputer to program block 43. The motor turns forwardly again and the process begins again until the desired depth of thread is reached. From this moment on, the microcomputer runs only on the program blocks 53 to 64 which essentially effect the return of the thread cutting tool to the last thread convolution. Program blocks 43 to 52 have substantially effected the advance of the thread cutting tool to the desired thread depth. Both program groups are similarly constructed and the following programs are of the same type and are treated as "subroutines" in the description of the program: 43 and 59, 44 and 60, 48 and 53, 49 and 54, 45 and 50 and 56 and 61, 46 and 51 and 57 and 62, 47 and 63, 52 and 48. Thus all the individual program blocks have been explained and the mode of operation of the program group 53 to 63 can be easily followed out with reference to FIG. 2, and consequently further description is unnecessary. Program block 64 controls the motor in reverse for approximately a further 1/10 sec, so that the thread cutting tool does not remain on the first thread convolution in any case. After the microcomputer has reached the waiting program block 40, a new identical thread hole can be cut by briefly pressing button 34 again.

The entire "software" of this thread cutting machine is accommodated in a permanent memory of the microcomputer and, despite many repeated "subroutines" comprises approximately 800 8-bit memory locations. This relatively considerable memory requirement imparts its relatively high intelligence to the thread cutting machine of the present invention. When the cutting tool is overloaded, the microcomputer reacts in forward and backward direction of the motor, both in general forward direction program group 43 to 52 and in the general backward direction, program group 53 to 63. The thread convolutions in both program groups are counted forwardly and backwardly so that at the end of the thread cutting process the desired number of thread convolutions is cut and the thread cutting tool is stationary after it has reached the starting position. During the thread cutting the motor can be stopped at any time with a safety button. The initial programming of the desired number of thread convolutions is effected simply by pressing a few buttons. By taking into consideration the depth of thread convolutions for each thread diameter and by taking into consideration the reduction numbers of the reducing gear, the programming of program blocks 37, 38 and 39 could be altered so that programming buttons could be directly indicated with thread diameter and the thread depth in millimeters.

Figure 3:
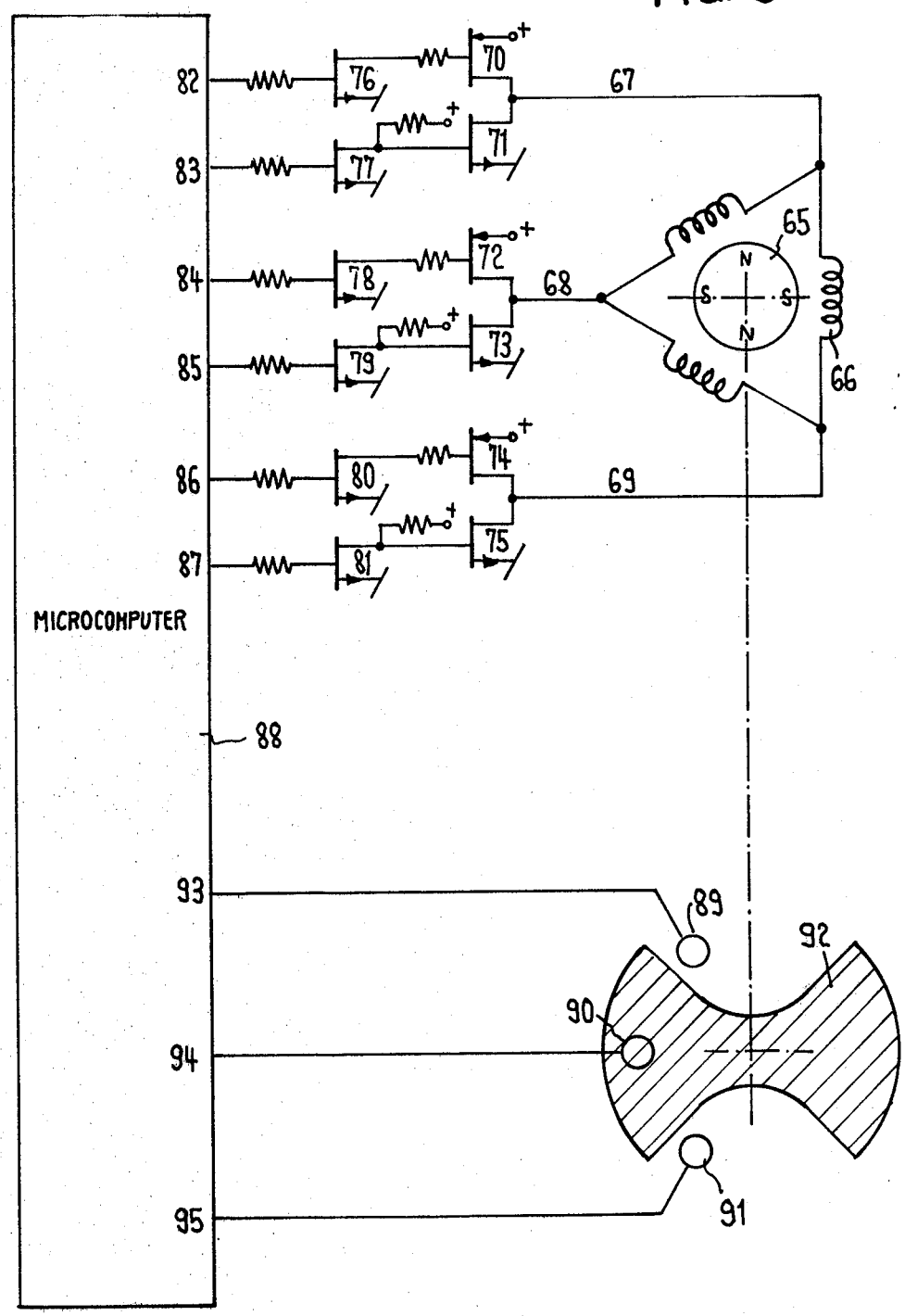
FIG. 3 illustrates the control and supply of the motor.

With reference to FIG. 3, the control or the feeding of the phases of the three-phase motor and the forward and backward counting of the rotations of the motor will be described in detail. The four pole magnetized rotor 65 rotates in a stator 66 with windings which are connected together, so that only three terminals 67, 68 and 69 extend out of the motor and each terminal 67, 68 and 69 is connected to the collectors of an output pair of Darlington transistors each consisting of an NPN and a PNP Darlington transistors 70 and 71, 72 and 73, 74 and 75. The emitters of the PNP Darlington transistors are connected to the direct current feed voltage, indicated by "+", whilst the emitters of the NPN Darlington transistors are connected to earth. The bases of the six Darlington transistors 70 to 75 are, as shown in FIG. 3, fed by six driver transistors 76 to 81, the bases of which in turn, are controlled by six outputs 82 to 87. Since the outputs 82 to 87 of the microcomputer 88 can receive only the conditions 0 and 1, or approximately 0 Volts and approximately +5 Volts, the transistors 70 to 81 are dimensioned with the circuit so that they act as switches. Consequently, for feeding the motor windings there are, on the stator 66 and consequently the feed line 67, 68 and 69, then six conditions changing the magnetic field direction of the stator 66. These are:

| | | |
|---|---|---|
| conductor 67 on voltage | conductor 68 to earth | conductor 69 dead |
| conductor 67 on voltage | conductor 68 dead | conductor 69 to earth |
| conductor 67 dead | conductor 68 on voltage | conductor 69 to earth |
| conductor 67 to earth | conductor 68 on voltage | conductor 69 dead |
| conductor 67 to earth | conductor 68 dead | conductor 69 on voltage |
| conductor 67 dead | conductor 68 to earth | conductor 69 on voltage |

When the conductors 67, 68 and 69 follow the series shown in the above described condition, the stator field of a four pole motor turns through an angle of 30° with each step and in the same direction. The premagnetized rotor 65 follows this movement. In the reverse sequence of the above conditions on the conductors 67, 68 and 69, the magnetic field in the stator 66 turns and the rotor 65 turns in the opposite direction.

So that the conductors 67, 68 and 69 are activated in the described sequence, the Darlington transistors 70 to 75 must assume the following conditions:

Darlington:

| 70 | 71 | 72 | 73 | 74 | 75 |
|---|---|---|---|---|---|
| active | passive | passive | active | passive | passive |
| active | passive | passive | passive | passive | active |
| passive | passive | active | passive | passive | active |
| passive | active | active | passive | passive | passive |
| passive | active | passive | passive | active | passive |
| passive | passive | passive | active | active | passive |

Therefore it is apparent from FIG. 3 that the drive transistors 76 to 81 must assume the following conditions:

Driver transistors:

| 76 | 77 | 78 | 79 | 80 | 81 |
|---|---|---|---|---|---|
| active | active | passive | passive | passive | active |
| active | active | passive | active | passive | passive |
| passive | active | active | active | passive | passive |
| passive | passive | active | active | passive | active |
| passive | passive | passive | active | active | active |
| passive | active | passive | passive | active | active |

Thus, for the six outputs 82 to 87 of the microcomputer 88 the following conditions result:

Outputs:

| 82 | 83 | 84 | 85 | 86 | 87 |
|---|---|---|---|---|---|
| 1 | 1 | 0 | 0 | 0 | 1 |
| 1 | 1 | 0 | 1 | 0 | 0 |
| 0 | 1 | 1 | 1 | 0 | 0 |
| 0 | 0 | 1 | 1 | 0 | 1 |
| 0 | 0 | 0 | 1 | 1 | 1 |
| 0 | 1 | 0 | 0 | 1 | 1 |

The six outputs 82 to 87 should be associated with the first six bits of an eight bit word. Our basis is the following arbitrary association. Bit zero with output 87, bit 1 with output 86, bit 2 with output 85, bit 3 with output 84, bit 4 with output 83 and bit 5 with output 82. Thus the motor codes are written, without consideration of the sixth and seventh bits of the eight bit word, expressed in hexadecimal, as follows:

31 34 IC 0D 07 and 13

If therefore the six outputs 82 to 87 of the microcomputer 88 are based in succession with the listed code words, the rotor 65 of the motor turns in steps of an angle of 30° in one direction. The code words in the reverse sequence, cause the rotor 65 to turn in the other direction of rotation. So that the motor turns continuously in one direction, the series must be started again with the first code word after the last code word.

The connection between the motor code words and the signals of the sensors for scanning the position of the rotor must now be explained. We start with the turning rotor 65 which, due to its initial magnetisation, induces voltages in the windings of the stator. On the three conductors or phases 67, 68 and 69, it would in this case be possible to measure sinusoidal alternating voltages which are displaced relatively to each other by 120° as in the normal three phase mains. The frequency of the alternating current voltages depends on the number of turns of the rotor 65. As we have seen, each two of three motor terminals 67, 68 and 69 are always connected to the direct current feed voltage source by the six motor codes and by means of the Darlington transistors 70 to 75. The motor codes must then be controlled in time so that the induced voltage in the motor passes through a maximum on the motor terminals which are precisely connected to the feed voltage and agrees with the polarity of said feed voltage. In this case the rotor would assume a speed (RPM) at which the peak value of the induced voltage between two of the three conductors 67, 68 and 69 is approximately equal to the feed voltage. When the motor is idling, the current in the motor which can now be measured as direct current in the feed circuit would be very small. When the motor is running under load this current would rise proportionally to the loading torque on the motor shaft. The measurement of the feed current is effected by means of the resistor 19 in FIG. 1.

The motor codes control at times so that the above described operating behaviour occurs, this means nothing other than to associate very definite sensor codes with the motor codes. We thus also need six sensor codes which implies that at least three sensors must be present for scanning the position of the rotor. To control a multi-phase motor, at least the same number of sensors as phases are required. Each sensor comprises substantially a photo-transistor 89, 90 and 91; infra-red diodes (not shown), opposed to the photo-transistors, and a diaphragm 92 jointly associated with all three sensors and secured to the shaft of the motor, said diaphragm being able to turn freely between the phototransistors and the infra-red diodes. The diaphragm 92 is designed so that, at angles of 90° relative to the axis of the motor, it is permeable to light and impermeable to light. The three sensors are secured to the stator of the motor at angular clearances of 60° each, relative to the axis of the motor.

Starting from the position of the diaphragm 92 in FIG. 3 and turning it in clockwise direction, the following sequence of possible conditions of the three phototransistors is obtained.

| Phototransistor | | |
| --- | --- | --- |
| 89 | 90 | 91 |
| light | dark | light |

| Phototransistor | | |
| --- | --- | --- |
| 89 | 90 | 91 |
| dark | dark | light |
| dark | light | light |
| dark | light | dark |
| light | light | dark |
| light | dark | dark |

Six conditions after a half rotation of the four pole motor can be ascertained and then the sequence resulting from six combinations is repeated again. For each subsequent condition the diaphragm has to be turned through an angle of 30° in one direction, as in ascertaining the motor codes. The signals of the photo-transistors 89, 90 and 91 lead to the inputs 93, 94 and 95 of the microcomputer 88 where they form the following sequence of conditions, 101 001 011 010 110 100. If it was desired to associate the following bits of an eight bit word with the inputs 93, 94 and 95: Bit 0 with input 95, bit 1 with input 94 and bit 2 with input 93, and to make the remaining bits equal to 0, the code words of the sensors would be expressed hexadecimally, 05 01 03 02 06 and 04. With these sensor code words we associate the corresponding motor code words:

| Sensor code word | Motor code word |
| --- | --- |
| 05 | 31 |
| 01 | 34 |
| 03 | IC |
| 02 | 0D |
| 06 | 07 |
| 04 | 13 |

By treating the sensor code words as addresses in the RAM memories and providing these memories with associated motor code words, the motor can be very simply controlled by indexed addressing in the program. These RAM memories are loaded in the initialising program and the recording appears as follows:

| | |
| --- | --- |
| 0001 | 34 |
| 0002 | 0D |
| 0003 | IC |
| 0004 | 13 |
| 0005 | 31 |
| 0006 | 07 |

The motor operates correctly according to the listed address table if the three terminals of the motor and the three terminals of the sensors, and also the angular position of the diaphragm are correctly effected with reference to the magnetic poles of the rotor. It is best to proceed practically for correct adjustment. The motor terminals 67, 68 and 69 should be switched to the three Darlington terminals in the six possible combinations. Only in one combination does the motor run quietly and with little current. The exact angular position of the diaphragm relative to the rotor is with the minimum of current consumption of the motor when idling and can be rapidly found by slightly turning the diaphragm relative to the rotor. So that the motor also turns in the other direction, it is only necessary to reverse the three signals of the sensors which is achieved according to "software" with the complement command for the code words of the sensors.

Referring to FIG. 3, the triple photocell control 89, 90 and 91 will now be described with a diaphragm 92 in its dual function for counting the rotations of the motor. It should be considered that the thread cutting machine can change its direction of rotation up to 10 times a sec. under difficult thread cutting conditions. If only one pair of photo-transistors and diodes were present, a case could occur in which the diaphragm 92 swings backwards and forwards on this photo-transistor without the motor having made a single rotation, however, each swinging operation would be evaluated in the microcomputer with half a rotation of the quadripole motor. With a triple arrangement of photo-transistors, as is necessary for the control or correct feeding of the triple phase motor, incorrect counting can be prevented purely by software. The microcomputer evaluates all three signals which originate from the photo-transistors 89, 90 and 91 and only then gives a command to the up and down counting program to count up or down when a half rotation of the motor shaft has been performed. Since the described triple phase motor has a quadripole rotor and the winding 66 is designed so that its electrical angle has executed 360° when the mechanical angle amounts to only 180°, two counts are effected per rotation of the motor. The evaluation of the three photocell signals for the exact counting of the rotations of the motor is described briefly with reference to the detailed program write out of the "subroutine" for the control of the motor in a forward direction. This program applies to a Motorola microprocessor 6800.

| 11B0 | B6 | 4000 | LDA | PIA | 4000 | Charge accumulator with data from the sensors. |
| 11B3 | 84 | 07 | AND | 07 | | Select only first three bits. |
| 11B5 | 97 | 0E | STA | M000E | | Store in RAM 000E. |
| 11B7 | DE | 0D | LDX | M000D | | Charge index register with content in RAM 000D and RAM 000E. 000D was 00. |
| 11B9 | A6 | 00 | x/00 | | | Charge accumulator index. |
| 11BB | B7 | 4002 | STA | PIA | 4002 | Store motor codes on the six outputs for motor drive. |

This was the program for the correct drive of the motor. Since the selected motor code remains in the accumulator, operation is now effected in the following motor revolution counting program with the motor codes instead of the sensor codes, which amounts to the same, since a clear sensor code is associated with each motor code.

| 11BE | 81 | 31 | 0MP31 | | Compare accumulator with motor code 31. |
| 11C0 | 26 | 17 | BNE11D9 | | If the same, continue otherwise jump to address 11D9. |
| 11C2 | D6 | 0F | LDA B M0 00F | | Charge second accumulator from RAM 00F (suppression memory). |
| 11C4 | 26 | 2A | BNE | 11F0 | If zero, continue, otherwise jump to address 11F0. |
| 11C6 | D6 | 10 | LDA B M0010 | | Charge second accumulator from RAM 0C10 (suppression memory). |
| 11C8 | 26 | 26 | BNE | 11F0 | If zero, continue, otherwise jump to address 11F0. |
| 11CA | FE | 0011 | LDX | M0011 | Charge index register with content of RAM 0011 and RAM 0012 (On countdown memory). |
| 11CD | 09 | | DEX | | Count one from content of the index register. |
| 11CE | FF | 0011 | STX | M0011 | Store the contents of the index register in RAM 0011 and RAM 0012. |
| 11D1 | 7C | 00DF | INC | M000F | Raise content of RAM 000F by one. |
| 11D4 | 7C | 0010 | INC | M0010 | Increase content of RAM 0010 by one. |
| 11D7 | 20 | 17 | BRA | 11F0 | Jump to address 11F0. |
| 11D9 | 81 | 34 | CMP | 34 | Compare accummulator with motor code 34. |
| 11DB | 26 | 08 | BNE | 11E5 | If the same, continue otherwise jump to address 11E5. |
| 11DD | 7F | 000F | CLR | M000F | Put content of RAM 000F to zero. |
| 11ED | 7C | 0010 | INC | M0010 | Increase content of RAM 0010 by one. |
| 11E3 | 20 | 0B | BRA | 11F0 | Jump to address 11F0. |
| 11E5 | 81 | 13 | CMP | 13 | Compare accumulator with motor code 13. |
| 11E7 | 26 | 07 | BNE | 11F0 | If the same, continue, otherwise jump to |

-continued

| | | | | | |
|---|---|---|---|---|---|
| | | | | | address 11F0. |
| 11E9 | D6 | 0F | LDA B | M000F | Charge second accummulator with the content of RAM 000F. |
| 11EB | 26 | 03 | BNE | 11F0 | If zero, continue, otherwise jump to address 11F0. |
| 11ED | 7F | 0010 | CLR | M0010 | Set content of RAM 0010 to zero. |
| 11F0 | 39 | | RTS | | Return from the "subroutine" to the main programm. |

We see from this program that the countdown of the contents of the memories 0011 and 0012 is effected only under the addresses 11CA, 11CD and 11CE and is counted only when the motor code 31 is switched to the motor and when the contents of the blocking memories 000F and 0010 is zero. After the countdown in the up and down memory locations 0011 and 0012, the contents of the blocking memory locations 000F and 0010 are increased by one and consequently no longer have the value nil. If the motor code should be repeated several times as a result of the swinging backwards and forwards of the diaphragm without the motor codes 34 and 13 being run through, no further counting can take place, since the course of the program under the addresses 11C4 or 11C8 execute a jump and thus avoids the counting. At first the blocking memories 000F and 0010 must be eliminated and this takes place only when the motor codes 34 and 13 are switched to the motor. So that, during the counting a decision may be made between the two directions of rotation—in the forward program only the forward direction should be considered—the contents of the blocking memory 0010 is raised by one under address 11E0 and under addresses 11E9 and 11E8 the memory 0010 is eliminated only if the content of the blocking memory 000F was not zero.

Thus, with this program, the revolutions of the rotor of the motor can be clearly counted when three sensor signals are being evaluated.

There is sufficient time for carrying out the program and there are sufficient permanent memory locations so that the expense resides only in three instead of one sensor. However, since the motor requires three sensors to control it, the expense for correctly counting the rotations of the motor may be regarded as practically nil and resides purely in the software which only costs something for its preparation.

Today microcomputers on one chip with a 2 MHz timing oscillator, microprocessor, 2000 memory locations in ROM, 128 memory locations in RAM and about 30 inputs and outputs may be obtained for very little money even in relatively small numbers. The program of the thread cutting machine according to the present invention occupies only about 800 memory locations in ROM. From this it may be seen that more than half of the storage capacity in ROM remain unused. With other programs it would therefore be possible to substantially increase the capacities of the thread cutting machine of the present invention. For example, it would be possible to provide programs which control the direct current feed voltage of the motor by means of a digital/analog converter and thus to influence the speed (RPM) of the motor. In the case of automatic operation of the thread cutting machine in a stroke controlled transfer chain, a program could take over the stroke control and stop the transfer chain, when for example the thread cutting tool is excessively worn or no lubricating fluid is flowing to the cutting thread hole.

In addition, it would be possible to elaborate programs which control difficult situations, for example, seize up of the thread cutting tool in the thread hole, or control the thread cutting machine so that the thread cutting tool is carefully and sensitively screwed out of the thread hole.

FIG. 4 shows the construction of an embodiment of a thread cutting apparatus. Mounted on the base plate 100, which can serve to mount a workpiece or workpiece holder, is a column 101 on which a frame 102 can be clamped in any desired vertical position. Disposed in a housing 103 secured to the frame 102 is the electronic system controllable in the described manner by means of buttons 104. The electronic system is connected, by a multi-core cable 105, to the thread cutting head 106 in which the driving motor for the thread cutting chuck 107 or the thread drill 108 is disposed. The thread cutting head 106 is vertically displaceable on a guide and its weight is partially compensated by traction springs 109. For cutting a thread, the cutter head 106 is raised manually and the thread drill 108 inserted by its tip in the bore prepared in the workpiece, whilst the thread drill exerts a pressure thereon which is sufficient to ensure the cutting operation when the motor starts.

I claim:

1. An electronically controlled machine for cutting a thread in a workpiece, comprising:
   a spindle;
   a thread-cutting tool coupled to said spindle;
   a multi-phase stepping motor coupled to said spindle for rotationally driving said spindle and tool, said tool engaging the workpiece to effect cutting of the thread thereby causing translational movement of said spindle and tool relative the workpiece;
   said driving motor having a shaft, a stator with a multi-phase stator winding, a rotor with at least one pair of magnetic poles, and sensor means for producing digital information signals indicative of the angular position of said rotor;
   a DC source;
   control means connected to said DC source and said multi-phase driving motor for producing cyclic driving pulses and delivering said cyclic driving pulses to said stator winding; and
   means connected to said sensor means and said control means for selecting the sequence of said cyclic driving pulses in response to said digital information signals, said selecting means including counter means for counting a sum of said digital information signals indicative of the number of revolutions of said spindle, memory means for storing a value indicative of a preselected number of revolutions of said spindle, and comparing means for comparing said sum contained in said counter means with said value stored in said memory means, said selecting means effecting reversal of the rotating sense of said motor upon coincidence of said sum and said value, thereby determining the dimension of the thread being cut.

2. A thread-cutting machine according to claim 1, further comprising adjustable means connected to said selecting means for setting a torque limit and means connected to said adjustable means for detecting a current flow in said stator winding indicative of the torque produced by said motor, said selecting means temporarily reversing the rotating sense of sais motor when said current flow indicative of the torque produced by said motor exceeds said torque limit.

3. A thread cutting machine according to claim 1, wherein said multi-phase motor is a three-phase motor.

4. A thread-cutting machine according to claim 1, wherein said sensor means includes at least one photo-sensitive element and one light-emitting element.

5. A thread-cutting machine according to claim 4, further comprising a diaphragm secured to said motor shaft so as to rotate between said photo-sensitive element and said light-emitting element.

6. A thread-cutting machine according to claim 1, wherein said sensor means includes at least as many pairs of said photo-sensitive and light-emitting elements for scanning the angular position of said rotor as said motor has phases.

7. A thread-cutting machine according to claim 1, wherein said selecting means comprises a microcomputer.

8. A thread-cutting machine according to claim 7, wherein said microcomputer utilizes said digital information signals produced by said sensor means indicative of the angular position of the rotor for controlling said motor and for counting the number of rotations of said rotor.

9. A thread-cutting machine according to claim 7, wherein said microcomputer effects the evaluation of the torque produced by said motor and reverses the direction of rotation of said motor upon detection that the torque has reached a predetermined value.

* * * * *